United States Patent [19]

Iwamoto

[11] 4,316,247
[45] Feb. 16, 1982

[54] LOW POWER CONSUMPTION DATA PROCESSING SYSTEM

[75] Inventor: Eisaburo Iwamoto, Tokyo, Japan
[73] Assignee: Texas Instruments, Inc., Dallas, Tex.
[21] Appl. No.: 89,708
[22] Filed: Oct. 30, 1979
[51] Int. Cl.³ .................. G06F 1/00; H03K 21/30
[52] U.S. Cl. .................. 364/200; 364/707; 365/227; 365/228
[58] Field of Search .......... 365/222, 226, 227, 228; 364/200 MS File, 900 MS File, 707

[56] References Cited

U.S. PATENT DOCUMENTS

| | | | |
|---|---|---|---|
| 3,941,989 | 3/1976 | McLaughlin et al. | 235/156 |
| 3,991,305 | 11/1976 | Caudel et al. | 364/900 |
| 4,137,563 | 1/1979 | Tsunoda | 364/200 |
| 4,151,611 | 4/1979 | Sugawara | 365/229 |
| 4,164,666 | 8/1979 | Hirasawa | 364/900 |
| 4,218,876 | 8/1980 | Hashimoto et al. | 364/707 |
| 4,240,150 | 12/1980 | Ebihara et al. | 364/707 |

OTHER PUBLICATIONS

"A Monostable CMOS RAM with Self-Refresh Mode", by Shiga et al., IEEE Journal of Solid-State CKT, vol. SC-11, No. 5, Oct. 76, pp. 609-613.
"Dynamic Refresh for Random Access Memory", Anon., Electronic Engineering, vol. 48, No. 583, p. 19, Sep. 1976.

*Primary Examiner*—Gareth D. Shaw
*Assistant Examiner*—Eddie Pang Chan
*Attorney, Agent, or Firm*—Thomas E. Tyson; John G. Graham; Melvin Sharp

[57] ABSTRACT

A data processing system which contains a read-only memory circuit, an arithmetic circuit, and a control circuit on a single semiconductor chip including a clock generating circuit for supplying system clocks to all of the circuits on the chip and the clock generating circuit is structured such that on the input of an external halt signal, the clock circuits will cease supplying system clocks during a period that provides for information contained within the system on the semiconductor chip.

6 Claims, 4 Drawing Figures

LOW POWER CONSUMPTION DATA PROCESSING SYSTEM

BACKGROUND OF THE INVENTION

1. Field of the Invention

The present invention relates to a large scale integrated circuit (LSI) microcomputer using a complementary type insulating gate transistor, and particularly provides a microcomputer of which semiconductor chip dimensions are small and power consumption can be minimized.

2. Description of the Prior Art

An arithmetic and logic unit in an integrated circuit (IC) can be generally classified into a static system and a dynamic system from the mechanism of the circuit.

The static system uses only a static logic such as a flip-flop circuit or a latch, and has an advantage that there is no time limit in the holding of information whereas this system has a disadvantage that it uses a large number of elements and accordingly the dimensions of the semiconductor chip become large.

On the other hand, the dynamic system includes dynamic logic which utilizes the electric charge accumulated in the gate floating capacity of an insulating gate type transistor for the maintenance of information. This system has an advantage over the static system in that, when compared with the same circuit, the former uses a smaller number of elements than the latter, in other words, a large number of arithmetic and logic units can be generated in the semiconductor chip of the same dimensions. The dynamic system has a disadvantage, however, since the electric charge of the gate floating capacity disappears because of leakage current. Therefore, it is necessary to rewrite (refresh) in a cycle of a certain time period (within a few milliseconds) to maintain the electric charge and the necessity of refreshing leads to increased power consumption.

Microcomputers of low power consumption operable with a battery, for example, having a large volume of arithmetic and logic units built in a semiconductor chip of small dimensions represented by a single-chip microcomputer, are in demand recently.

As a means for satisfying the request for low power consumption, the use of a complementary type insulating gate transistor (there are many kinds for this type, and all of these shall be hereinafter called "C-MOS" in the present specification) has been considered instead of the conventional P channel or N channel insulating gate transistors. The use of the C-MOS certainly reduces the power consumption. However, when the static system is employed, the required number of elements is large, so that the dimensions of the semiconductor chip become greater. When the dynamic system is employed, an attempt to operate the computer by a clock signal of high frequency to increase the execution speed causes an increase in power consumption due to rise in the frequency.

In examining the dynamic system in detail, the dynamic logic ROM or RAM requires a precharge period. Information in the logic is not destroyed even if the internal system clock is stopped during this precharge period. In other words, a period that can be called an information non-destructive period exists in the dynamic logic. The random logic of the dynamic system also includes a portion of static logic such as the aforementioned latch, and no information is destroyed even if the system clock is stopped during the period while necessary information exists in this static logic. In other words, the period called an information non-destructive period also exists in the random logic.

SUMMARY OF THE INVENTION

Taking the above-mentioned points into consideration, the present invention is to provide a microcomputer having both the advantage of the dynamic system being of small dimensions and large capacity and the advantage of low power consumption, by revising the conventional design of each dynamic circuit to prohibit the stopping of the system clocks during periods that would result in the destruction of information being stored.

It is another object of the present invention to provide a microcomputer of which all the system clocks can be stopped externally during a certain period by applying a level signal called a halt (HALT) signal to one of the input terminals of the microcomputer.

The system maintains the idle condition during which no operation is performed but the dynamic memory is refreshed. Power consumption during the conventional halt period remains the same as that in other conditions. The halt in the present invention lowers power consumption by reducing leakage current during the stopping of the system clocks used for the operation of the dynamic logic. The power consumption of 15 milliwatt (mW) which was necessary in the past for the dynamic logic even in the halt condition, can be lowered to 5 microwatt ($\mu$W) using the present invention.

Conventionally, the HALT operations is a result of software. In the present invention, the HALT operation is the result of an input from an external source allowing for an increase in speed of signal processing (since hardware replaces instruction processing).

BRIEF DESCRIPTIONS OF THE DRAWINGS

DESCRIPTION OF THE PREFERRED EMBODIMENTS

The embodiment of the present invention is generally the same as the construction set forth in U.S. Pat. No. 3,991,305 assigned to Texas Instruments and said Patent being incorporated herein by reference. The description for the microcomputer in this disclosure is the same as the one in U.S. Pat. No. 3,991,305 described in Column 4, line 40 to Column 9, line 26.

Figure 1:
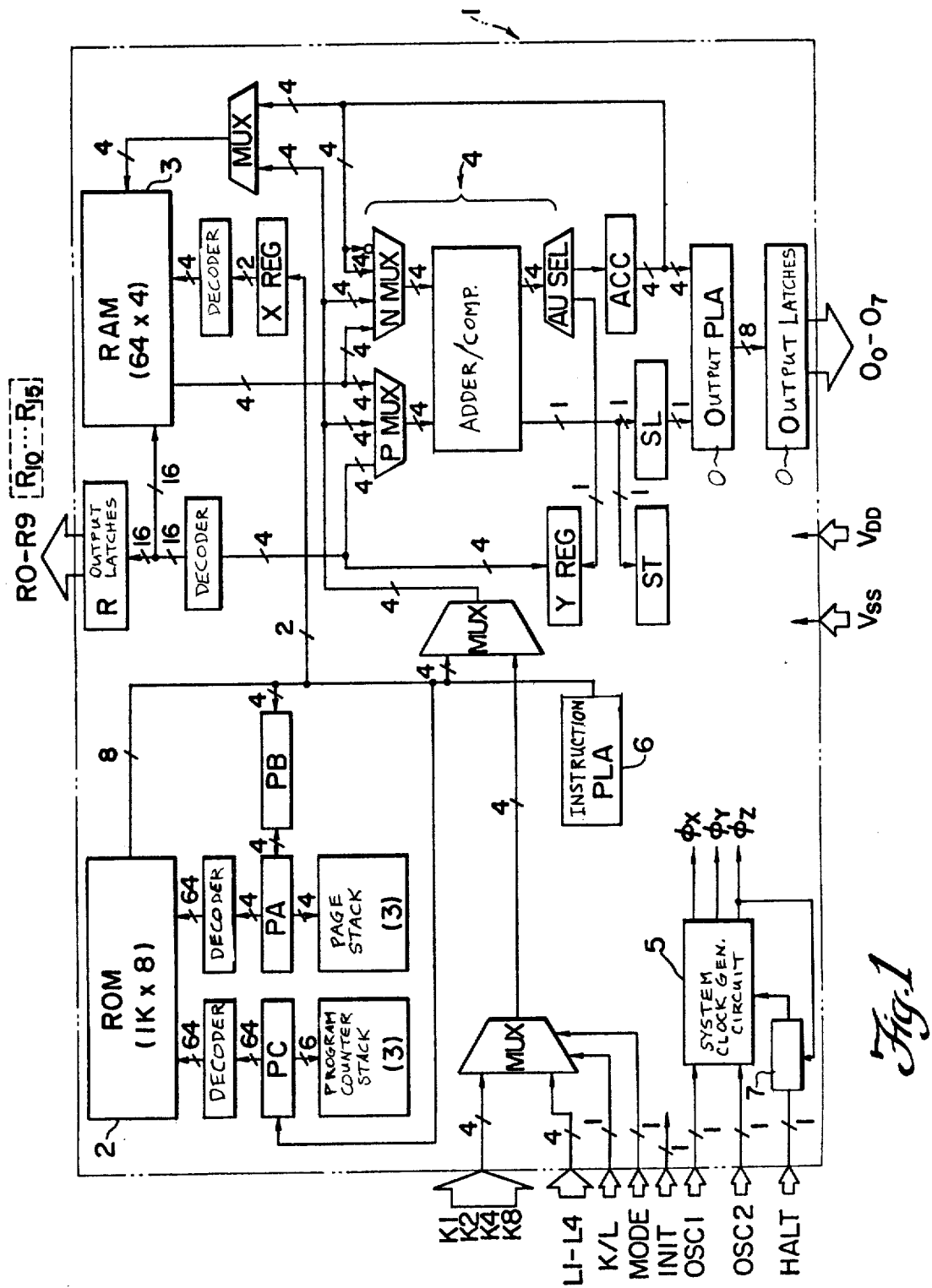
FIG. 1 is a block diagram showing one embodiment of the minicomputer according to the present invention.

FIG. 1 is a block diagram showing the whole of the microcomputer which is the embodiment of the present invention. In the diagram, a microcomputer 1 includes a read only memory (ROM), a random access memory (RAM), an arithmetic circuit and a control circuit which are structured on a single semiconductor chip a complementary type insulating gate trar or (C-MOS FET) integrated circuit. This microcon, ter is of the type in which the gate mask is altered in the manufacturing process in accordance with the program made by a user in coding the fixed ROM inside the chip.

The operations of the minicomputers are the same as that described in U.S. Pat. No. 3,991,305 (line 1, column 6 to line 26, column 9) hereby incorporated by reference.

Operation of the ROM

ROM 2 which is built in the microcomputer 1 can store the instructions of 1024 words × 8 bits. The operation of the elements within the microcomputer 1 are controlled by these instructions. The ROM 2 can be divided into 16 pages and each page can store 64 instructions. A program starts at predetermined address from an input from the power supply, and thereafter a program counter PC sequentially executes the ROM instructions of each page. The address of the page is contained in the page address register, PA. Conditional branch instructions or call subroutine instructions can alter the program counter. The operation of the program counter and the page address register is similar to the operation of the program counter and the page address register in U.S. Pat. No. 3,991,305, line 14, column 14–line 33, column 17. The ROM and ROM page address decoder are similar to the ROM and ROM page address decoder in U.S. Pat. No. 3,991,305, line 46, column 19, to line 68, column 20.

Operation of the RAM

RAM 3 consists of address specificable 256 bits and is structured by four files of 16 words × 4 bits. The RAM 3 is addressed by an X register XREG and a Y register YREG and the Y register is controlled by an arithmetic circuit 4 and specifies one word out of 16 words in one file. The microcomputer 1 has instructions "Compare the contents of Y with the constant.", "Set a constant in Y.", "Increase the contents of Y by 1.", "Reduce the contents of Y by 1.", "Transfer data to or from Y.", etc.

Two bits in the X register XREG select one of four files of the RAM 3. Either a constant or a complement is placed in the X register XREG, and a four bit data word is transferred to a RAM address (location) specified by the X register XREG and the Y register YREG, where the data word originates from a constant, accumulator ACC or the ROM 2. The output word from the RAM 3 is processed by the arithmetic circuit 4 and is transferred to the Y register YREG or the accumulator ACC with an interval of one instruction. All the bits in the RAM 3 can be set/reset or tested. The RAM is the same as described in U.S. Pat. No. 3,991,305, line 49, column 9, to line 17, column 11. The X REG is the same as the RAM page address register described from line 15 to line 44, column 19 of the same patent.

Operation of arithmetic and logical unit (ALU)

Arithmetic and logical operations are executed by 4-bit adders and their AND circuit, and the arithmetic circuit compares logical operation, compares arithmetic operation and executes addition and subtraction. The ALU is the same as described in U.S. Pat. No. 3,991,305, line 19, column 11 to line 54, column 12.

Input/Output

The microcomputer 1 includes eight data inputs of K1, K2, K4, K8 and L1, L2, L3, L4, which are multiplexed and guided to a 4-bit input bus. The microcomputer 1 further includes control inputs called K/L selector and mode selector. The K/L control input has an inside pulldown register and the K input is selected from there is no input or when the K/L input is at low level. When the K/L input is at high level, a 4-bit L input is selected. The remaining input circuitry is similar to the input circuitry disclosed in U.S. Pat. No. 3,991,305, line 35, column 17 to line 12, column 19.

This microcomputer 1 has two output channels of R output and O output to suit multiple purposes. The R output is normally used to multiplex the input and is also used to synchronize the display output, external memory output or the O output as an output data. The output circuitry is similar to the output circuitry disclosed in U.S. Pat. No. 3,991,305, line 8, Column 22 to line 29, Column 23.

Instruction PLA (programmable logic array)

Programmable instructions are defined by an instruction PLA 6. 32 programable input NAND gates decode 8-bit instructions. Each NAND gate output selects combination of 16 microinstructions. These 16 microinstructions control write inputs of the arithmetic and logical unit (ALU), status latch and RAM 3. The instruction PLA is similar to the capital data, capital path, capital control, PLA disclosed in U.S. Pat. No. 3,991,305, line 56, column 12 to line 40, column 13.

Clock generating circuit

Figure 3:
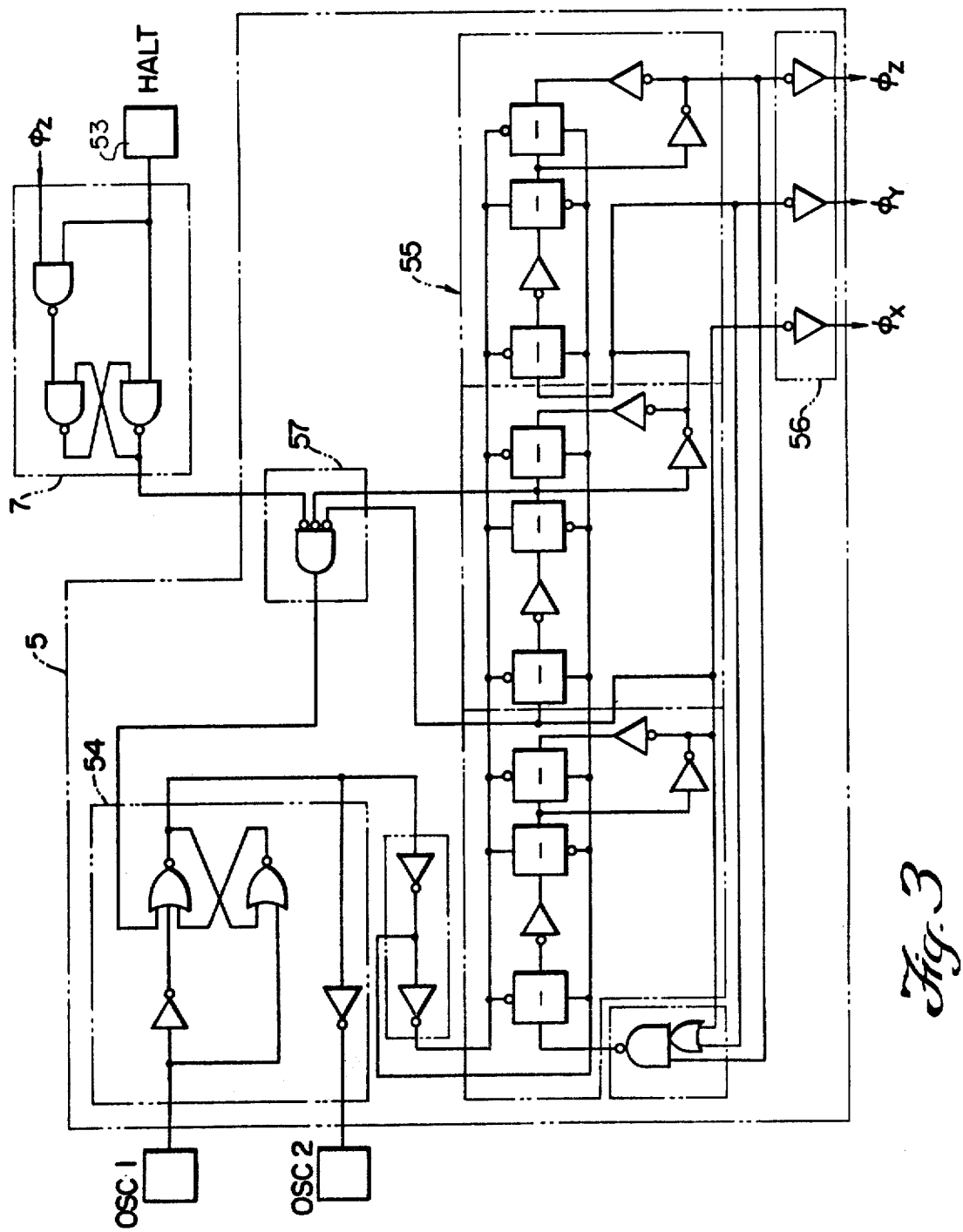
FIG. 3 is an electrical circuit diagram of the HALT input circuitry and the system clocking circuitry shown in FIG. 1.
Figure 4:
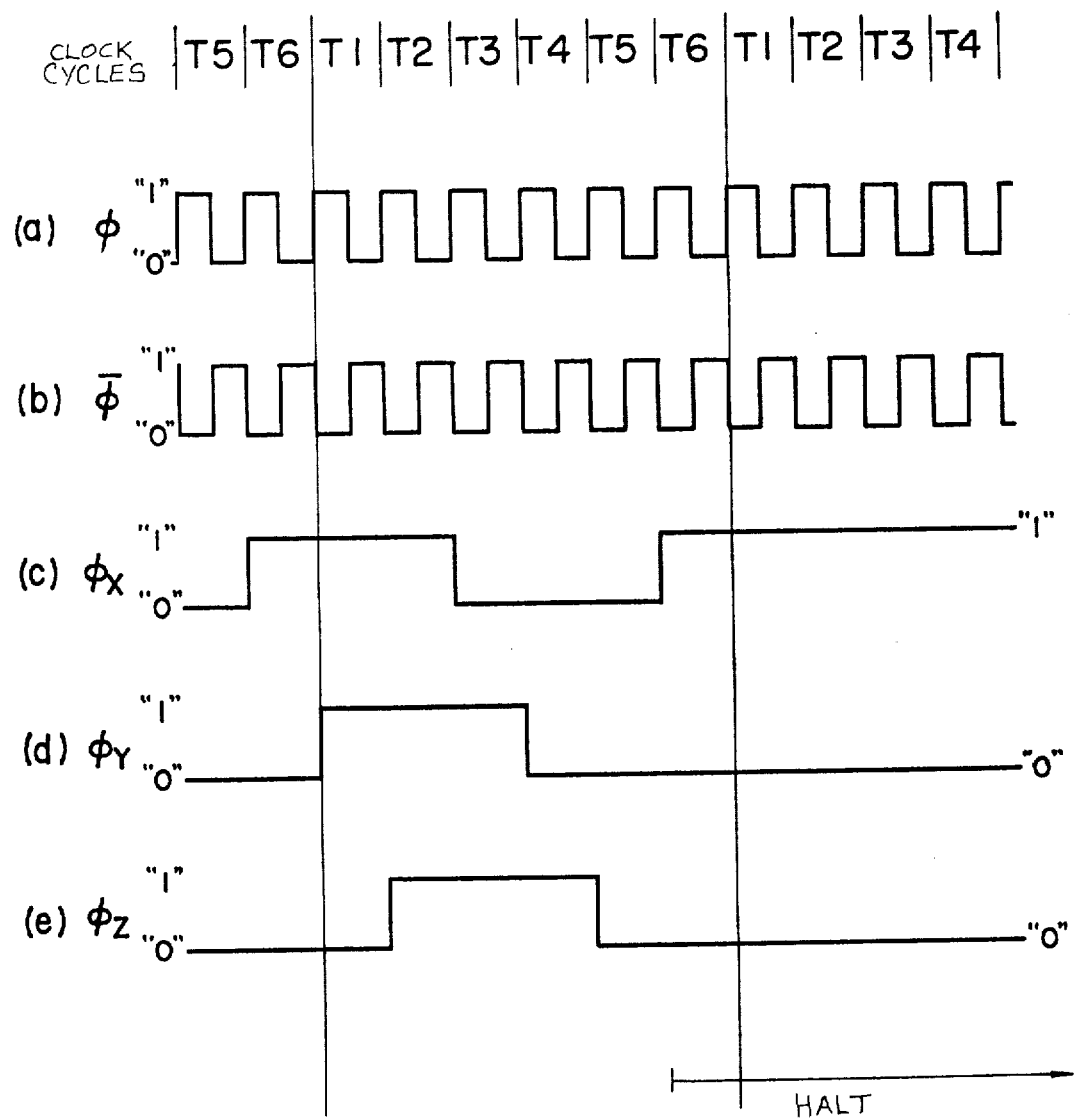
FIG. 4 is a timing diagram of the circuits shown in FIG. 3.

Signal processing inside the microcomputer 1 is performed in synchronization with the system clocks ($\phi_X$, $\phi_Y$, $\phi_Z$ in FIG. 4) that are generated by a clock generating circuit 5 based on the external clocks from terminals OSC 1 and OSC 2. It is one of the characteristics of the present invention to apply an input halt signal shown by HALT in FIG. 1 to the clock generating circuit 5 thereby stopping the system clocks from the clock generating circuit 5. This point will be described in detail later. The clock generating circuit 5 is illustrated in FIG. 3.

Timing

In the embodiment of the present invention, one instruction cycle consists of six clock cycles, and execution of instructions does not overlap instruction cycles. Actual machine cycle time is determined by the resistors and capacitors connected to the pins of the oscillator OSC 1 and the oscillator OSC 2 or the external clock input frequency applied to the oscillator OSC 1. As an example, an instruction cycle may be set from 6 to 120 μs and each clock cycle can be set to 1/6 thereof, that is 1 to 20 μs.

Figure 2:
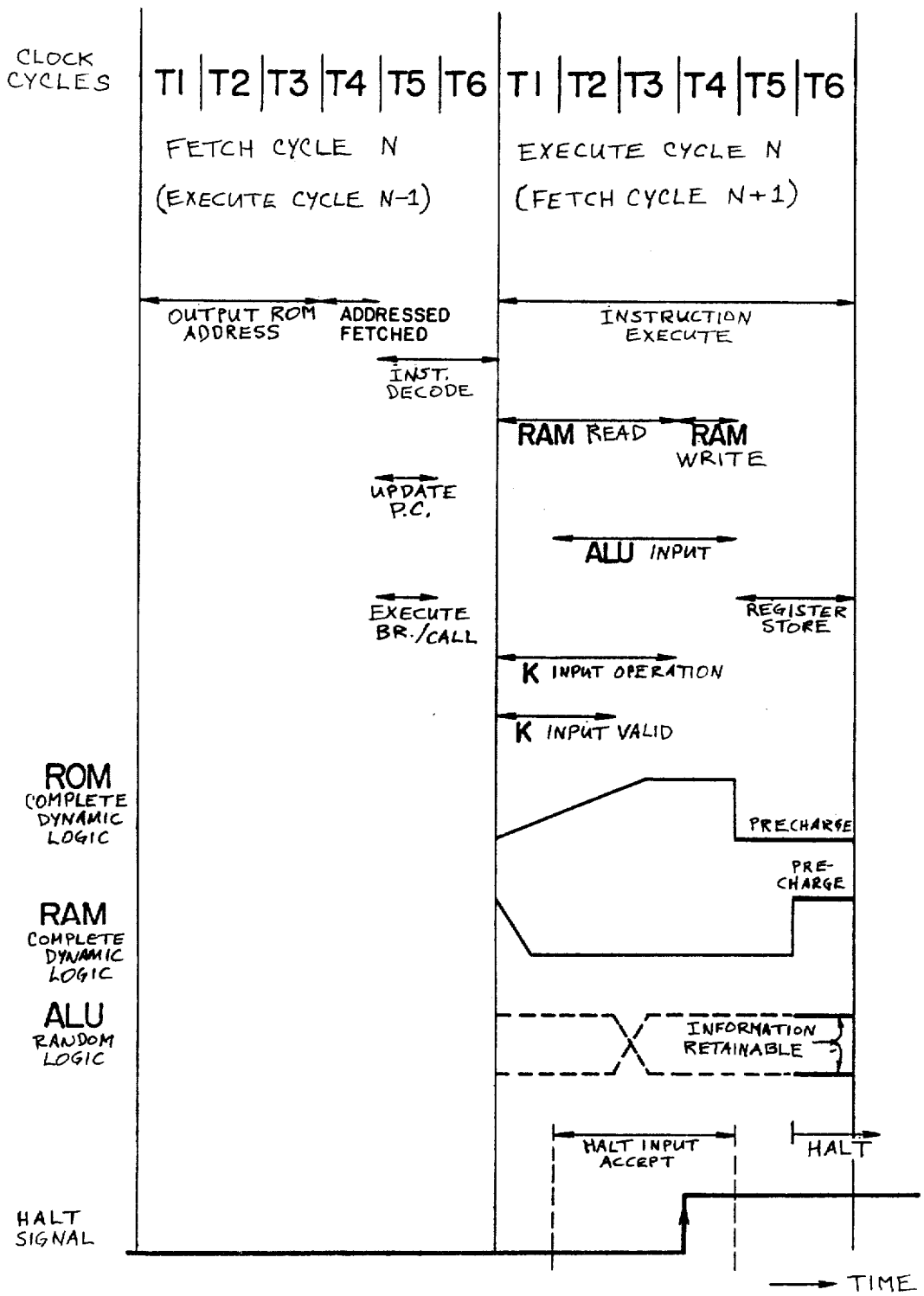
FIG. 2 is a timing diagram showing the operating condition of the embodiment shown in FIG. 1.

FIG. 2 shows a timing chart of the output, input and instructions in the embodiment of the present invention shown in FIG. 1. The diagram shows time flow from left to right as viewed in the drawing. The first instruction cycle shown on the left half is a fetch cycle for fetching the instruction N and is simultaneously an execute cycle for executing the preceding instruction. The second instruction cycle is a cycle for executing the instruction N fetched by the first instruction cycle and is simultaneously a cycle for fetching the next instruction (N+1). In the lower half of the diagram, various operation timings relating to the instruction N are described in correspondence with clock cycles $T_1$ through $T_6$.

In describing the instruction N, the addressing of the ROM is performed during the period from $T_1$ to $T_3$ of the first instruction cycle, and the address is fetched at $T_4$. At $T_5$ the program counter is updated and the branch call is executed. In the second instruction cycle, the instruction is executed over the period from $T_1$ to $T_6$, and the data of the RAM is read during the period from $T_1$ to $T_3$, written in the RAM at $T_4$ and applied as input to the ALU at $T_3$ and $T_4$.

In the case of the present embodiment, the ROM 2, RAM 3, instructions PLA 6, etc. are constructed in a complete dynamic logic. As an example to show the condition of the instruction cycle of the complete dynamic logic, only the ROM and RAM are shown in FIG. 2. As can be observed clearly in FIG. 2, the system is so designed that at least a part of the precharge period of the ROM and RAM, which are the complete dynamic logic, are overlapped with the timing of $T_6$. The random logic of other dynamic systems is also so designed, as shown in FIG. 2 for the ALU as an example. When it is necessary to store information during the halt period (i.e., information that is not held by the gate floating capacity) the information is placed in the static logic. Those portions of the waveforms of the ROM, RAM and random logic shown by the thick lines indicate the afore-mentioned precharge period and information storable period.

Operation of the halt signal

FIG. 3 shows the clock generating circuit 5 in the embodiment of the present invention shown in FIG. 1. This circuit is formed on the semiconductor substrate as a part of a large scale integrated circuit (LSI) and as a part of the microcomputer 1 shown in FIG. 1 and includes an oscillating input terminals OSC 1 and OSC 2, halt signal input terminal HALT, oscillating circuit 54, hexadecimal counter 55 structured by a transfer gate, and a clock output circuit 56. The output signals $\phi_X$, $\phi_Y$ and $\phi_Z$ produced from the clock output circuit 56 are supplied to almost all the circuits of the microcomputer shown in FIG. 1 and form basic system clocks to control time. The wiring arrangements of the output circuit 56 and the supply destination of these system clocks are omitted in FIG. 1 in accordance with the custom.

In the embodiment of the present invention, it is no designed that high-level halt signals are received only during the period from $T_2$ to $T_4$ of the execute cycle by the halt signal gate circuit 7 of FIG. 3. In other words, even if halt signals are generated at $T_5$ and $T_6$, halt is not accepted until $T_2$ of the next cycle. Thus, by not allowing halt signal inputs during $T_5$ or $T_6$, it is possible to eliminate an uncertainty of the system caused by the delayed signal in the system.

In FIG. 3, signals shown in FIG. 4(a) and (b) are supplied from the external oscillator to the oscillating circuit 54 via the oscillating input terminals OSC 1 and OSC 2, respectively. When a low-level signal (for example the $V_{SS}$ level) is in the input terminal 53 of the halt signal, this microcomputer continues normal operation, and conversely when a high-level (for example the $V_{DD}$ level) signal enters the input terminal 53, the halt stops the computer.

When a low-level signal is coupled to the halt signal input terminal HALT, in other words when the halt function is not working, the oscillating signals shown in FIG. 4(a) and (b) enter the oscillating circuit 54 and pass through the hexadecimal counter 55 and the clock output circuit 56 so that the system clocks $\phi_X$, $\phi_Y$ and $\phi_Z$ shown in FIG. 4(c), (d) and (e) are produced as outputs. In the present invention, only three clocks $\phi_X$, $\phi_Y$ and $\phi_Z$ are used to produce basic clock signals to operate each circuit, so that timing from $T_1$ to $T_6$ is obtained from the combination of the system clocks $\phi_X$, $\phi_Y$ and $\phi_Z$.

When the halt signal of high level enters the input terminal HALT of FIG. 3, the output operation of the oscillating circuit 54 stops. If the halt was allowed irrespective of the timings $T_1$ to $T_6$, the position to accumulate information could not be specified. To avoid this drawback, the present invention provides the halt signal gate circuit 7 to restrict the exercise of the halt signal to one of the timing signals ($\phi_Z$ in case of the present embodiment) and produces an input at NOR circuit 57 so that halt signals are accepted only at the predetermined optional timings ($T_2$ to $T_4$ in case of the present embodiment) out of the six timings of $T_1$ to $T_6$ in one instruction cycle. In the case of the present embodiment, a signal enters from the hexadecimal counter 55 to the NOR circuit 57 at the timing equivalent to $T_6$ so that the halt function does not work at $T_6$ which is the final timing of the instruction cycle as described before. In the case of the present embodiment, $\overline{HALT}$, $\overline{\phi_X}$ and $\phi_Y$ are applied to the NOR circuit 57 and a particular timing $T_6$ in the instruction cycle is determined by $\overline{\phi_X}$ and $\phi_Y$. When $\overline{HALT}$, $\overline{\phi_X}$, $\phi_Y$ and $\phi_Z$ are all "0", the halt function is executed. Since a halt signal is accepted only during the period from $T_2$ to $T_4$, the system can be stopped stably.

Since the system is built so that the information within the dynamic circuit is in the static logic at a specific timing $T_6$ when this halt operation is executed, necessary information is maintained even if the system clocks are stopped. It is thus possible to obtain a high density integration in small dimensions, which is the advantage of the dynamic logic, and to keep, without destruction, the information within the circuit structured by the complementary type insulating gate FET by using this halt junction implementation and thereby reducing the power consumption to an extremely low level.

Although the term, C-MOS is used in the present specification, the present invention is not limited to the FET of a metal gate and it is obvious that the present invention can be applied to an FET of a metal gate, a silicon gate or other types of gate. Further, the term, complementary type or C-MOS is used in wide meaning in the present specification. Namely, for example, the term may also imply that the P channel MOS and the N channel MOS employed for ROM etc. are manufactured separately but the circuit as a whole uses both the P channel MOS and the N channel MOS.

What is claimed:

1. An electronic data processing system including a read-only memory, a random-access memory, an arithmetic circuit and a control circuit, all structured using complementary field-effect transistors and all receiving external power during normal operation further comprising:

a clock circuit for simultaneously and repetitively generating a plurality of clock phases during a cycle, means for coupling said clock phases to said read-only memory circuit, said random access memory circuit, said arithmetic circuit and said control circuit;

a halt input terminal circuit coupled to said clock circuit for stopping said clock circuit from generating said clock phases and responsive to a halt input and one of said clock phases representing the time which allows the maintenance of information contained in said system without continued operation of said clock circuit, whereby the only power requirement during the stopping of said clock circuit is to refresh said random-access memory thereby conserving power.

2. An electronic data processing system according to claim 1, wherein said read-only memory circuit, said arithmetic circuit and said control circuit are constructed as dynamic logic.

3. An electronic data processing system according to claim 1, wherein said random-access memory circuit is structured as static logic.

4. An electronic data processing device all structured using complementary field-effect transistors implemented on a single semiconductor substrate and all receiving external power during normal operation comprising:
  a read-only memory for the storage of instructions;
  a random-access memory for the storage of data;
  a control circuit which provides control signals in response to said instructions;
  an arithmetic circuit which performs operations on said data in response to said control signals;
  a clock circuit for simultaneously and repetitively generating a plurality of clock phases during a cycle, means for coupling said clock phases to said read-only memory circuit, said random-access memory circuit, said arithmetic circuit and said control circuit;
  a halt input terminal circuit coupled to said clock circuit for stopping said clock circuit from generating said clock phases and responsive to a halt input and one of said clock phases representing the time which allows the maintenance of information contained in said system without continued operation of said clock circuit, whereby the only power required during the stopping of said clock circuit is to refresh said random-access memory thereby conserving power.

5. An electronic data processor device according to claim 4, wherein said read-only memory circuit, said arithmetic circuit and said control circuit are constructed as dynamic logic.

6. An electronic data processor device according to claim 5, wherein said random-access memory circuit is structured as static logic.

* * * * *